UNITED STATES PATENT OFFICE.

CHARLES N. WAITE, OF MEDFORD, MASSACHUSETTS, ASSIGNOR TO THE AVERY LACTATE COMPANY, OF PORTSMOUTH, NEW HAMPSHIRE.

PROCESS OF LACTIC FERMENTATION.

SPECIFICATION forming part of Letters Patent No. 368,032, dated August 9, 1887.

Application filed August 6, 1884. Serial No. 139,787. (No specimens.)

*To all whom it may concern:*

Be it known that I, CHARLES N. WAITE, of Medford, in the county of Middlesex and State of Massachusetts, have invented certain Improvements in the Process of Lactic Fermentation, of which the following is a specification.

My invention relates to the production of a pure lactate of lime; and it consists in the process hereinafter more specifically set forth.

In carrying out my process I follow this formula: I take four hundred pounds of water, one hundred pounds of white glucose, cane-sugar, or starch, fifty pounds of carbonate of lime, one-half pound of sulphate of ammonia, one-fourth ounce of phosphoric acid, and a small quantity of lactic ferment.

It is essential to my process that there should be an absolute exclusion of air, and hence I place the above mixture in a closed vessel having a small outlet, dipping under water, and remove whatever air there may remain in the vessel by a current of carbonic acid. This mixture I keep at a temperature between 40° and 50° centigrade. Fermentation lasts from twelve to fifteen days, when all the sugar, starch, or glucose is transformed into lactic acid, which unites with the lime, forming the lactate.

Among the advantages of my process I may name the following: First, the addition of a very small quantity of nitrogenous matter in its purest form—viz., ammonia—not more than enough to feed the lactic ferment, which appropriates it at once, thus preventing the simultaneous growth of other ferments; and, secondly, I avoid the addition of foreign matters not necessary to lactic fermentation, and which involve great difficulty in their subsequent removal from the lactate of lime at the end of the fermentation. My product is substantially free from foreign matter, is of a light color and an agreeable odor. As stated, I find it necessary to exclude every trace of air from the fermenting liquor. An artificial medium poor in nitrogen is not as favorable to the growth of lactic ferment as a natural medium (such as milk, decoction of meal, &c.) containing a large amount of nitrogenous matter. A vigorous ferment is not killed by a slight quantity of air, although its activity is greatly diminished, and hence milk, cornmeal, &c., may be fermented in open vessels; but I find that in order to make a lactic ferment live in an artificial medium every trace of air must first be removed.

Having thus described my invention, what I claim as new, and desire to secure by Letters Patent, is—

1. In the production of pure lactate of lime, the fermentation of a liquid consisting of water mixed with sugar, glucose, or pure starch free from albuminoids, and containing a minute quantity of nitrogen in the form of ammonia, together with a minute quantity of phosphoric acid, in a closed vessel from which all air has been excluded, substantially as set forth.

2. In the production of pure lactate of lime, the process of fermenting sugar, glucose, or pure starch by the addition of ammonia, phosphoric acid, and lactic ferment in a closed vessel in the absence of air, substantially as set forth.

In testimony whereof I have signed my name to this specification, in the presence of two subscribing witnesses, this 31st day of July, 1884.

CHARLES N. WAITE.

Witnesses:
  C. F. BROWN,
  H. BROWN.